United States Patent
Arefyev et al.

(10) Patent No.: US 11,122,105 B2
(45) Date of Patent: Sep. 14, 2021

(54) SYSTEM AND METHOD FOR COMPONENT BASED WEB SERVICES DEVELOPMENT

(71) Applicant: Embarcadero Technologies, Inc., Austin, TX (US)

(72) Inventors: Dmitry Arefyev, Afonino (RU); Marco Cantu, Piacenza (IT)

(73) Assignee: Embarcadero Technologies, Inc., Austin, TX (US)

(*) Notice: Subject to any disclaimer, the term of this patent is extended or adjusted under 35 U.S.C. 154(b) by 0 days.

(21) Appl. No.: 16/913,644

(22) Filed: Jun. 26, 2020

(65) Prior Publication Data
US 2020/0412789 A1 Dec. 31, 2020

Related U.S. Application Data

(60) Provisional application No. 62/868,274, filed on Jun. 28, 2019.

(51) Int. Cl.
*H04L 29/08* (2006.01)
*G06F 16/2452* (2019.01)

(52) U.S. Cl.
CPC .......... *H04L 67/02* (2013.01); *G06F 16/2452* (2019.01); *H04L 67/16* (2013.01); *H04L 67/28* (2013.01); *H04L 69/329* (2013.01)

(58) Field of Classification Search
CPC combination set(s) only.
See application file for complete search history.

(56) References Cited

U.S. PATENT DOCUMENTS

2005/0021689 A1* 1/2005 Marvin .................... G06F 8/31
                                                                709/220
2019/0286721 A1* 9/2019 Sharma ................ G06F 16/532

* cited by examiner

*Primary Examiner* — El Hadji M Sall
(74) *Attorney, Agent, or Firm* — Foley & Lardner LLP

(57) ABSTRACT

A web services development platform includes one or more processors and memory coupled storing instructions that cause the processors to receive a web service component arranged on a design surface of the web services development platform to implement a web service for a computer application. The web service component includes predefined code to support a plurality of methods for the web service. The processors display a plurality of properties associated with the web service component on an object viewer of the web services development platform. The processors receive an input via the object viewer enabling one or more allowed actions properties from among the plurality of properties, where each of the allowed actions properties corresponding to a method from among the plurality of methods for the web service. The processors configure the web service component based on, at least in part, the selected one or more allowed actions properties to enable the first web service component to process incoming requests at runtime according to the enabled ones of the allowed actions properties for the first web service component.

20 Claims, 8 Drawing Sheets

SYSTEM AND METHOD FOR COMPONENT BASED WEB SERVICES DEVELOPMENT

CROSS-REFERENCE TO RELATED APPLICATIONS AND CLAIM OF PRIORITY

This application claims the benefit of U.S. Provisional Application No. 62/868,274, filed Jun. 28, 2019, the content of which are fully incorporated herein by reference in its entirety.

BACKGROUND

The present disclosure relates generally to a web services development platform. The present disclosure relates more particularly to systems and methods for developing web services using a component-based development model.

Web services are self-contained modular applications that can be published and invoked over the Internet. Unlike web server applications that generate web pages for user interaction via client browsers, web services are not designed for direct human interaction. Rather, web services are designed to enable data exchange between client and server using various open protocols and standards, such that the web services can be accessed programmatically by client applications without requiring specific platforms or programming languages.

Generally, web services are implemented by writing manual code in a specific class (depending on the framework) for each Uniform Resource Locator (URL) endpoint and each Hypertext Transfer Protocol (HTTP) method supported. The class then handles all HTTP requests mapped to a single specific URL (or endpoint) and uses the request parameters as an input to determine how to respond to the request. Writing manual code to implement various web services can be an extremely time consuming process, often requiring manual code to implement common scenarios and operations.

Accordingly, systems and methods for reducing or eliminating manual code for developing and/or implementing web services may be desired.

The above information disclosed in this Background section is for enhancement of understanding of the background of the invention, and therefore, it may contain information that does not constitute prior art.

SUMMARY

According to an example embodiment, a web services development platform includes one or more processors, and memory coupled to the one or more processors and storing instructions that, when executed by the one or more processors, cause the one or more processors to: receive a web service component arranged on a design surface of the web services development platform to implement a web service for a computer application, the web service component including predefined code to support a plurality of methods for the web service; display a plurality of properties associated with the web service component on an object viewer of the web services development platform; receive an input via the object viewer enabling one or more allowed actions properties from among the plurality of properties, each of the allowed actions properties corresponding to a method from among the plurality of methods for the web service; and configure the web service component based on, at least in part, the selected one or more allowed actions properties to enable the first web service component to process incoming requests at runtime according to the enabled ones of the allowed actions properties for the first web service component.

According to further examples, the design surface is a data module.

According to further examples, each of the methods correspond to a Hypertext Transfer Protocol (HTTP) operation for the web service, and each of the allowed actions properties corresponds to an HTTP verb for a corresponding HTTP operation.

According to further examples, the input includes a selection of at least two of the allowed actions properties such that the first web service component is configured to support at least two corresponding HTTP operations for the web service.

According to further examples, the first web service component comprises predefined code to support a plurality of HTTP operations, and the allowed actions properties are selected to enable corresponding ones of the HTTP operations.

According to further examples, another property of the plurality of properties corresponds to a link property indicating a connection to a resource for serving responses to the incoming requests.

According to further examples, the link property indicates a direct path to the resource for serving responses to the incoming requests.

According to further examples, the link property indicates a connection to another object, the other object connecting to the resource for serving responses to the incoming requests.

According to further examples, the other object is a database query object comprising a connection to the resource and one or more queries for retrieving data from the resource.

According to further examples, another property of the plurality of properties correspond to an options property to enable sorting or paging of requested data associated with an incoming request.

According to a further example embodiment, a method for implementing web services utilizing a component-based development model includes: receiving a web service component arranged on a design surface of the web services development platform to implement a web service for a computer application, the web service component including predefined code to support a plurality of methods for the web service; displaying a plurality of properties associated with the web service component on an object viewer of the web services development platform; receiving an input via the object viewer enabling one or more allowed actions properties from among the plurality of properties, each of the allowed actions properties corresponding to a method from among the plurality of methods for the web service; and configuring the web service component based on, at least in part, the selected one or more allowed actions properties to enable the first web service component to process incoming requests at runtime according to the enabled ones of the allowed actions properties for the first web service component.

According to further examples of that method, the design surface is a data module.

According to further examples of that method, each of the methods correspond to a Hypertext Transfer Protocol (HTTP) operation for the web service, and each of the allowed actions properties corresponds to an HTTP verb for a corresponding HTTP operation.

According to further examples of that method, the input includes a selection of at least two of the allowed actions properties such that the first web service component is configured to support at least two corresponding HTTP operations for the web service.

According to further examples of that method, the first web service component comprises predefined code to support a plurality of HTTP operations, and the allowed actions properties are selected to enable corresponding ones of the HTTP operations.

According to further examples of that method, another property of the plurality of properties corresponds to a link property indicating a connection to a resource for serving responses to the incoming requests.

According to further examples of that method, the link property indicates a direct path to the resource for serving responses to the incoming requests.

According to further examples of that method, the link property indicates a connection to another object, the other object connecting to the resource for serving responses to the incoming requests.

According to further examples of that method, the other object is a database query object comprising a connection to the resource and one or more queries for retrieving data from the resource.

According to further examples of that method, another property of the plurality of properties correspond to an options property to enable sorting or paging of requested data associated with an incoming request.

DETAILED DESCRIPTION

Figure 1:
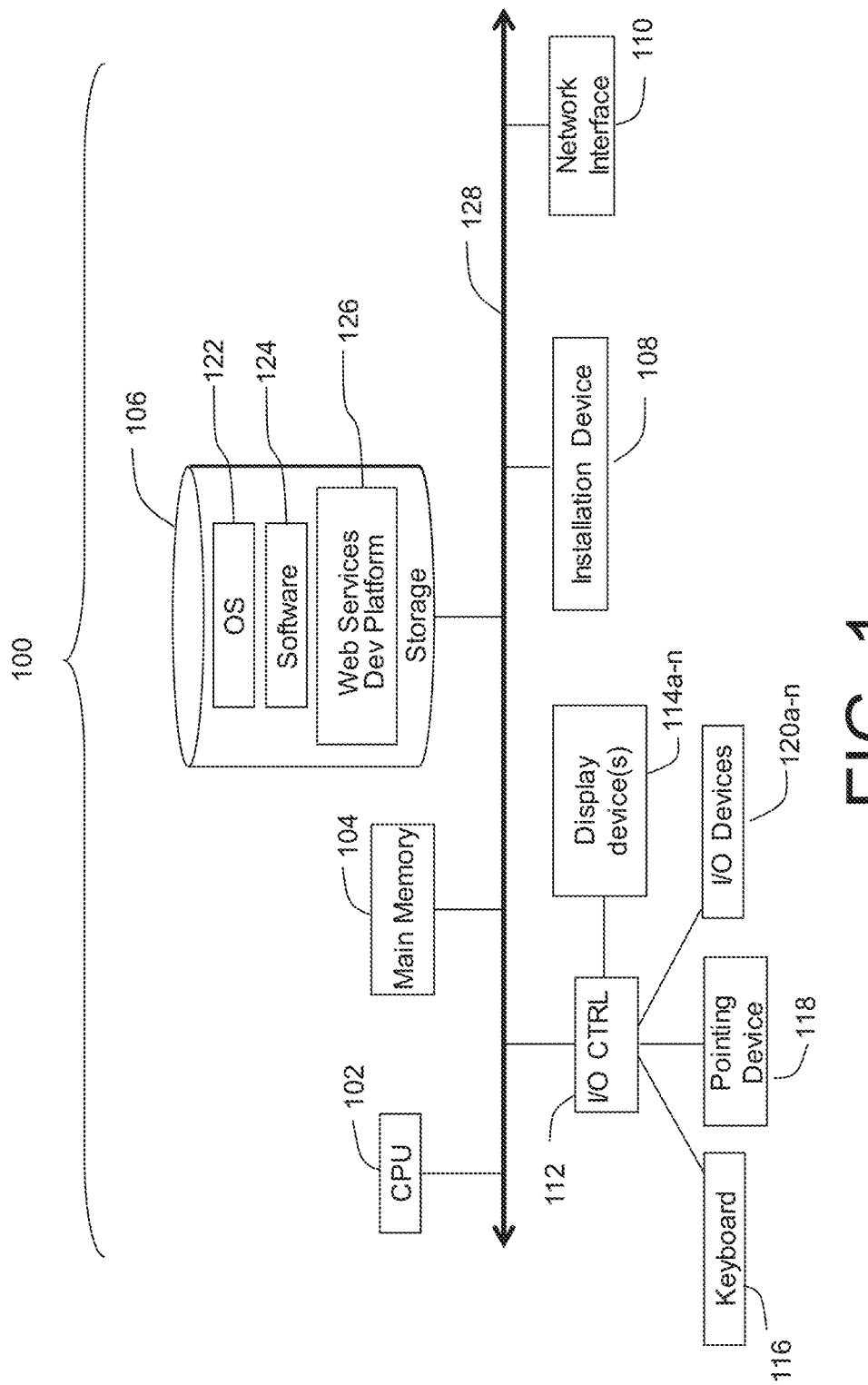
FIG. 1 is a block diagram of a computing device, according to some embodiments.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description.
Computing Device Referring now to FIG. 1, a block diagram of a computing device is shown, according to some embodiments. The computing device 100 may be useful for practicing one or more embodiments of the present disclosure. As shown in FIG. 1, in some embodiments, the computing device 100 includes a central processing unit 102, a main memory unit 104, a storage device 106, an installation device 108, a network interface 110, an input/output (I/O) controller 112, one or more display devices 114 (e.g., 114a-114n), a keyboard 116, and a pointing device 118 (e.g., a mouse). The storage device 106 may include, without limitation, an operating system (OS) 122, software 124, and a software instance of a web services development platform (or tool) 126. The computing device 100 may also include additional optional elements, for example, such as a memory port, a bridge, one or more input/output devices 120 (e.g., 120a-120n), and cache memory in communication with the central processing unit 102.

In some embodiments, the central processing unit 102 may be any suitable logic circuitry that responds to and processes instructions fetched from the main memory unit 104. In some embodiments, the central processing unit 102 is provided by a microprocessor unit. For example, in some embodiments, the microprocessor unit may include one or more microprocessors manufactured by Intel Corporation of Mountain View, Calif., Motorola Corporation of Schaumburg, Ill., the ARM processor and TEGRA system on a chip (SoC) manufactured by Nvidia of Santa Clara, Calif., the POWER7 processor, those manufactured by International Business Machines of White Plains, N.Y., and/or by Advanced Micro Devices of Sunnyvale, Calif. The computing device 100 may be based on any of these processors, or any other suitable processor capable of operating as described herein. In various embodiments, the central processing unit 102 may utilize instruction level parallelism, thread level parallelism, different levels of cache, and/or multi-core processors. A multi-core processor may include two or more processing units on a single computing component. Examples of a multi-core processors include the AMD PHENOM IIX2, INTEL CORE i5 and INTEL CORE i7.

In some embodiments, the main memory unit 104 may include one or more memory chips capable of storing data and allowing any storage location to be directly accessed by the central processing unit 102. In some embodiments, the main memory unit 104 may be volatile and faster than the storage device 106. In various embodiments, the main memory unit 104 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), and/or Extreme Data Rate DRAM (XDR DRAM). In some embodiments, the main memory 104 or the storage device 106 may be non-volatile memory, for example, such as non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), and/or Millipede memory. The main memory 104 may be based on any of the above described memory chips, or any other available memory chips capable of operating as described herein. In some embodiments, the central processing unit 102 communicates with the main memory unit 104 via a system bus 128 (described in more detail below). In other embodiments, the central processing unit 102 may communicate directly with the main memory unit 104 via a memory port.

In some embodiments, the central processing unit 102 may communicate directly with cache memory via a secondary bus, sometimes referred to as a backside bus. In other embodiments, the central processing unit 102 may communicate with cache memory using the system bus 128. Cache memory typically has a faster response time than the main memory unit 104, and is typically provided by SRAM, BSRAM, or EDRAM. In some embodiments, the central processing unit 102 communicates with various I/O devices 120 via a local system bus (e.g., the system bus 128). Various buses may be used to connect the central processing unit 102 to any of the I/O devices 120, including a PCI bus, a PCI-X bus, or a PCI-Express bus, or a NuBus. In embodiments in which the I/O devices 120 include a video display device 114, the central processing unit 102 may use an Advanced Graphics Port (AGP) to communicate with the display device 114 or the I/O controller 112 for the display device 114.

In various embodiments, a wide variety of I/O devices 120a-120n may be included in the computing device 100. For example, in various embodiments, the input devices of the I/O devices 120a-n may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, and/or other sensors. In various embodiments, the output devices of the I/O devices 120a-n may include, for example, video displays, graphical displays, speakers, headphones, inkjet printers, laser printers, and/or 3D printers.

In some embodiments, I/O devices 120a-120n may include a combination of multiple input or output devices, such as, for example, Microsoft KINECT, Nintendo Wiimote for the WII, Nintendo WII U GAMEPAD, Apple IPHONE, Android based smart phones, and/or the like. In some embodiments, some of the I/O devices 120a-120n may allow gesture recognition inputs through a combination of some of the inputs and outputs. In some embodiments, some of the I/O devices 120a-120n may provide for facial recognition, which may be utilized as an input for different purposes including authentication and other commands. In some embodiments, some of the I/O devices 120a-120n may provide for voice recognition and inputs, such as, for example, Microsoft KINECT, SIRI for IPHONE by Apple, Google Now or Google Voice Search, and/or the like.

In some embodiments, addition I/O devices 120a-120n may have both input and output capabilities, including, for example, haptic feedback devices, touchscreen displays, multi-touch displays, and/or the like. Touchscreen, multi-touch displays, touchpads, touch mice, or other touch sensing devices may use different technologies to sense touch, including, for example, capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), force-based sensing technologies, and/or the like. Some multi-touch devices may allow two or more contact points with the surface, allowing advanced functionality including, for example, pinch, spread, rotate, scroll, and/or other gestures. Some touchscreen devices, including, for example, Microsoft PIXELSENSE and Multi-Touch Collaboration Wall, may have larger surfaces, such as on a table-top or on a wall, and may also interact with other electronic devices. In some embodiments, some of the I/O devices 120a-120n, display devices 114a-114n, or group of devices may be augment reality devices. In some embodiments, the I/O devices (e.g., keyboard 116, pointing device 118, display devices 114, and/or I/O devices 120) may be controlled by the I/O controller 112. In some embodiments, an I/O device may also provide storage and/or an installation medium (e.g., installation device 108) for the computing device 100. In still other embodiments, the computing device 100 may provide USB connections to receive handheld USB storage devices. In further embodiments, an I/O device 120 may be a bridge between the system bus 128 and an external communication bus, for example, such as a USB bus, a SCSI bus, a FireWire bus, an Ethernet bus, a Gigabit Ethernet bus, a Fibre Channel bus, a Thunderbolt bus, and/or the like.

In some embodiments, the display devices 114a-114n may be connected to the I/O controller 112. In various embodiments, the display devices 114a-114n may include, for example, a liquid crystal display (LCD), a thin film transistor LCD (TFT-LCD), a blue phase LCD, an electronic papers (e-ink) display, a flexible display, a light emitting diode display (LED), a digital light processing (DLP) display, a liquid crystal on silicon (LCOS) display, an organic light-emitting diode (OLED) display, an active-matrix organic light-emitting diode (AMOLED) display, a liquid crystal laser display, a time-multiplexed optical shutter (TMOS) display, a 3D or stereoscopic display, and/or the like. Examples of 3D displays may include, for example, stereoscopy, polarization filters, active shutters, autostereoscopy, and/or the like. Display devices 114a-114n may also include a head-mounted display (HMD). In some embodiments, display devices 114a-114n or the corresponding I/O controllers 112 may be controlled through or have hardware support for OPENGL, DIRECTX API, and/or other graphics libraries.

In some embodiments, the computing device 100 may include or connect to multiple display devices 114a-114n, which each may be of the same or different type and/or form. As such, any of the I/O devices 120a-120n and/or the I/O controller 112 may include any type and/or form of suitable hardware, software, or combination of hardware and software to support, enable or provide for the connection and use of multiple display devices 114a-114n by the computing device 100. For example, the computing device 100 may include any type and/or form of video adapter, video card, driver, and/or library to interface, communicate, connect or otherwise use the display devices 114a-114n. In one embodiment, a video adapter may include multiple connectors to interface to multiple display devices 114a-114n. In other embodiments, the computing device 100 may include multiple video adapters, with each video adapter connected to one or more of the display devices 114a-114n. In some embodiments, any portion of the operating system 122 of the computing device 100 may be configured for using multiple displays 114a-114n. In other embodiments, one or more of the display devices 114a-114n may be provided by one or more other computing devices connected to the computing device 100, via a network. In some embodiments software may be designed and constructed to use another computer's display device as a second display device 114a for the computing device 100. For example, in one embodiment, an Apple iPad may connect to a computing device 100 and use the display of the computing device 100 as an additional display screen that may be used as an extended desktop. One of ordinarily skill in the art will recognize and appreciate the various ways and embodiments that a computing device 100 may be configured to have multiple display devices 114a-114n.

In some embodiments, the storage device 106 (e.g. one or more hard disk drives or redundant arrays of independent disks) may store the operating system 122, and/or other related software, and may store application software programs such as any program related to the software instance of the web services development platform 126. Examples of the storage device 106 may include hard disk drive (HDD), optical drive including CD drive, DVD drive, and/or BLU-RAY drive, solid-state drive (SSD), USB flash drive, and/or any other suitable device for storing data. Some storage devices 106 may include multiple volatile and non-volatile memories, such as, for example, solid state hybrid drives that combine hard disks with solid state cache. Some storage devices 106 may include non-volatile, mutable, and/or read-only. Some storage devices 106 may be internal and may connect to the computing device 100 via the bus 128. Some storage devices 106 may be external and may be connect to the computing device 100 via an I/O device 120 that provides an external bus. Some storage devices 106 may connect to the computing device 100 via the network interface 110 over a network, such as, for example, the Remote Disk for MACBOOK AIR by Apple. Some computing devices 100 may not require a non-volatile storage device 106 and may be thin clients or zero clients. Some storage devices 106 may also be used as an installation device 108, and may be suitable for installing software and programs. Additionally, the operating system and the software can be run from a bootable medium, for example, such as a bootable CD (e.g. KNOPPIX), which may be a bootable CD for GNU/Linux that is available as a GNU/Linux distribution from knoppix.net.

In some embodiments, the computing device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on the computing device 100. An application distribution platform may include a repository of applications on a server or a cloud, which the computing device 100 may access over a network (e.g., the Internet). An application distribution platform may include application developed and provided by various developers. A user of the computing device 100 may select, purchase, and/or download an application via the application distribution platform.

In some embodiments, the computing device 100 may include the network interface 110 to interface to a network through a variety of connections including, but not limited to, for example, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, and/or some combination of any or all of the above. Connections can be established using a variety of communication protocols (e.g., TCP/IP, Ethernet, ARCNET, SONET, SDH, Fiber Distributed Data Interface (FDDI), IEEE 802.11/b/g/n/ac CDMA, GSM, WiMax and direct asynchronous connections). In one embodiment, the computing device 100 communicates with other computing devices via any type and/or form of gateway or tunneling protocol (e.g. Secure Socket Layer (SSL) or Transport Layer Security (TLS), or the Citrix Gateway Protocol manufactured by Citrix Systems, Inc. of Ft. Lauderdale, Fla.). In some embodiments, the network interface 110 may include, for example, a built-in network adapter, network interface card, PCMCIA network card, EXPRESSCARD network card, card bus network adapter, wireless network adapter, USB network adapter, modem, and/or any other suitable device for interfacing the computing device 100 to any type of network capable of communication and performing the operations described herein.

In some embodiments, the computing device 100 may operate under the control of the operating system 122, which controls scheduling of tasks and access to system resources. In various embodiments, the computing device 100 may run any suitable operating system 122, such as, for example, any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, and/or any other suitable operating system capable of running on the computing device 100 and performing the operations described herein. Some examples of operating systems 122 include, but are not limited to: WINDOWS 2000, WINDOWS Server 2012, WINDOWS CE, WINDOWS Phone, WINDOWS XP, WINDOWS VISTA, WINDOWS 7, WINDOWS RT, WINDOWS 8, WINDOWS 10, and/or the like, all of which are manufactured by Microsoft Corporation of Redmond, Wash.; MAC OS and iOS, manufactured by Apple, Inc. of Cupertino, Calif.; Linux, a freely-available operating system, e.g. Linux Mint distribution ("distro") or Ubuntu, distributed by Canonical Ltd. of London, United Kingdom; Unix or other Unix-like derivative operating systems; and Android, designed by Google, of Mountain View, Calif., but may include others. Some operating systems 122, including, for example, the CHROME OS by Google, may be used on zero clients or thin clients (e.g., CHROMEBOOKS).

In various embodiments, the computing device 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, and/or any other suitable type and/or form of computing, telecommunications, or media device that is capable of communication. The computing device 100 has sufficient processor power and memory capacity to perform the operations described herein. In some embodiments, the computing device 100 may have different processors, operating systems, and input devices consistent with the device.

In some embodiments, the computing device 100 may be a gaming system. For example, the computing device 100 may include a PLAYSTATION (1, 2, 3, 4, and/or the like), a PERSONAL PLAYSTATION PORTABLE (PSP), and/or a PLAYSTATION VITA device manufactured by the Sony Corporation of Tokyo, Japan, a NINTENDO DS, NINTENDO 3DS, NINTENDO WII, and/or a NINTENDO WII U device manufactured by Nintendo Co., Ltd., of Kyoto, Japan, an XBOX 360, XBOX one, and/or the like manufactured by the Microsoft Corporation of Redmond, Wash., and/or the like.

In some embodiments, the computing device 100 may be a digital audio player such as the Apple IPOD, IPOD Touch, and IPOD NANO lines of devices, manufactured by Apple Computer of Cupertino, Calif. Some digital audio players may have other functionality, including, for example, a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and/or .mp4 MPEG-4 (H.264/MPEG-4 AVC) video file formats.

In some embodiments, the computing device 100 may be a tablet, for example, such as the IPAD line of devices by Apple; GALAXY TAB family of devices by Samsung; KINDLE FIRE, by Amazon.com, Inc. of Seattle, Wash.; and/or the like. In other embodiments, the computing device 100 may be an eBook reader, such as, for example, the KINDLE family of devices by Amazon.com, or the NOOK family of devices by Barnes & Noble, Inc. of New York City, N.Y.

While some non-limiting examples of various computing devices 100 and components thereof have been described herein, the present disclosure is not limited to. For example, other suitable computing devices and/or components thereof relating to one or more of the various aspects of the operating environments and components described above in the context of the systems and methods disclosed herein are contemplated, as will be apparent to those having ordinary skill in the art.

Web Services Development Platform

Figure 2:
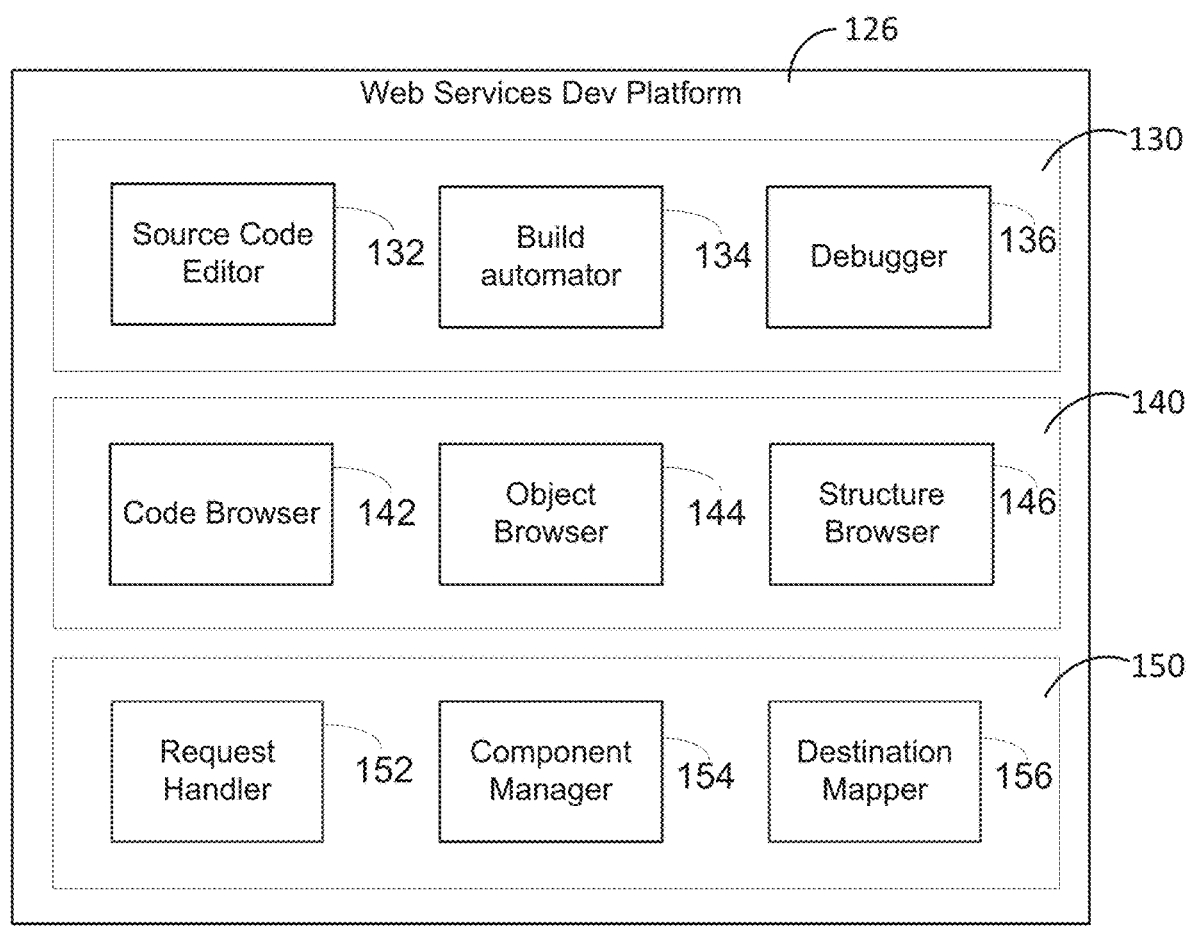
FIG. 2 is a block diagram depicting a web services development platform, according to some embodiments.

Referring now to FIG. 2, a block diagram depicting the web services development platform 126 of FIG. 1 is shown in more detail, according to some embodiments. In some embodiments, the web services development platform 126 is a software program executed on the computing device 100. In other embodiments, the web services development platform 126 may be hosted on a cloud computing platform including one or more controllers, servers, and/or any other suitable computing devices that can be accessed by the computing device 100 over a network (e.g., the Internet) via the network interface 110. In some embodiments, the web services development platform 126 may include or be a part of a software development environment to facilitate software developers in building software applications for various different operating systems. For example, in some embodiments, the web services development platform 126 may be part of an integrated development environment (IDE), such as any of the RAD Studio product lines developed by Embarcadero Technologies. However, in other embodiments, the web services development platform 126 may be a separate design tool (e.g., computer program) that facilitates the development of web services for various computer applications (e.g., client applications, desktop applications, mobile applications, and/or the like) for various different computer programs, applications, operating systems, devices, and/or interfaces.

For example, in some embodiments, the web services development platform 126 may facilitate software developers in designing a computer application (e.g., a client application, a Graphical User Interface (GUI), and/or the like) or web services for the computer application. In some embodiments, the web services development platform 126 may facilitate in the design of the computer application for a particular type of computing device (e.g., a particular type of operating system) or for various different computing devices (e.g., various different operating systems). For example, in some embodiments, the web services development platform 126 may include virtualization software to virtually simulate different operating systems, computing devices, and/or platforms, so that the software developer can view and design computer applications having consistent look and feel across various devices, operating systems, and platforms.

In some embodiments, the web services development platform 126 may generate a plurality of versions of the computer application so that each version is tailored to execute or run on a different type of computing device, operating system, or platform. In various embodiments, such different versions may be created automatically or under control (e.g., user input) of the software developer. Accordingly, in some embodiments, a software developer may utilize the web services development platform 126 to design an application to run on more than one type of device, operating system, or platform. For a non-limiting example, the web services development platform 126 may facilitate in the design of the computer application to execute on a desktop computer running a Windows operating system and a smart phone running an Android operating system. However, in other embodiments, other types of devices and operating systems may be employed, for example, such as any of the devices and/or operating systems described above with reference to FIG. 1.

In more detail, as shown in FIG. 2, the web services development platform 126 may include a code generator 130, a developer interface 140, and a web services manager 150, according to some embodiments. In some embodiments, the code generator 130 facilitates in the generation of software code and software builds for a computer application or web services for the computer application. For example, in some embodiments, the code generator 130 may include a source code editor 132. In some embodiments, the source code editor 132 may be a textual-based computer program configured to enable software developers to read, write, and edit the source code of a computer application, web services for the computer application, or any other suitable computer program. In some embodiments, the source code editor 132 may include features that simplify the generation of source codes, such as, for example, syntax checking, syntax highlighting, autocomplete, brace matching, and/or the like. In some embodiments, the source code editor 132 may include a structure editor that enables software developers to edit the structure of the source code using a syntax tree.

In some embodiments, the code generator 130 may further include a build automator 134, a debugger 136, and/or the like. In some embodiments, the build automator 134 facilitates the creation of a software build, including, for example, compiling code, packaging code, running automated tests, and/or the like. In some embodiments, the debugger 136 facilitates testing and debugging of the code, for example, by enabling various test functions such as querying processors, resolving symbols, interpreting expressions, single-stepping, program animation, breaking, tracking, verifying, reverse debugging, source-level debugging, symbolic debugging, low-level debugging, machine-language debugging, and/or the like. However, in other embodiments, the code generator 130 may include any number of suitable modules or functions to facilitate in the generation, build, and/or debugging of the source code associated with the computer application or web services for the computer application.

In some embodiments, the developer interface 140 may provide an interface (e.g., GUI) to a software developer to interact with various graphics, components, and/or controls (collectively referred to as objects) to develop the computer application or web services for the computer application. For example, in some embodiments, the developer may utilize the pointing device 118 to select and position various graphical and non-graphical objects into a design area (or design surface) of a visual designer (e.g., a 2-dimensional and/or 3-dimensional designer, editor, and/or the like) for generating a GUI associated with the computer application via the developer interface 140. In some embodiments, the design area may include, for example, a window, form, card, pane, frame, 3-dimensional design area or surface, and/or the like, such that the objects arranged on the design area are shown at runtime as they would appear on a display window, mobile display screen, subsets (e.g., controls, portions of a window or screen, or the like) of a larger UI, or the like.

In some embodiments, the developer may utilize the pointing device 118 to select and position various web services components (or web services objects) and other objects into a design area (or design surface) of the developer interface 140 for implementing various web services via the developer interface 140. In this case, the design area may include a data module or other design surface that is similar to the design area for generating the GUI, except the data module is not associated with any particular display window, mobile display screen, or the like. Instead, the data module maps the web services components arranged thereon to a particular endpoint (e.g., URL), such that at runtime, incoming requests for web services at the particular endpoint are mapped to the web services component(s) to handle the incoming requests according to the configured properties of the web services component(s) and other objects. For example, in some embodiments, the developer may arrange one or more web services components (and other linked objects as needed or desired) on the data module to map the web services components to the particular endpoint (e.g., URL), and may configure one or more properties of the web services components to enable allowable actions (e.g., HTTP verbs) and other parameters in the incoming request that are supported by the web services components.

For example, in some embodiments, the developer interface 140 may include a code browser 142 (or code viewer), an object browser 144 (or object viewer), and a structure browser 146 (or structure viewer). In some embodiments, the code browser 142 enables software developers to browse, navigate, and visualize the source code for the computer application or web services. For example, the code browser 142 presents the source code in a window or section of the developer interface 140 to enable software developers to browse, navigate, and modify the source code. In some embodiments, the object browser 144 enables software developers to visualize the hierarchy of the objects (e.g., graphics, components, and/or controls) and web services components for the computer application or web services, including properties and events as well as other pertinent information associated with the objects and web services components. In some embodiments, the object browser also provides an interface in a window or section of the developer interface 140 to enable interaction with the objects and web services components and/or their properties. In some embodiments, the structure browser 146 enables software developers to visualize the structure of the source code by showing the code's classes, attributes, operations, and relationships among objects and web services components in a class diagram (e.g., a tree diagram) that describes the parent-child relationship of the objects, web services components, and controls with respect to other objects, web services components, and controls.

In some embodiments, the web services development platform 126 may include one or more libraries or databases (e.g., stored in a storage device) of various predefined, customized, and/or imported objects and web services components that may be used for creating the computer application (e.g., a GUI) or web services. These objects and web services components may have various properties, each of the properties having a simplistic value (e.g., text or number) or a complex value (e.g., sub-values) that define its own set of properties (e.g., sub-properties, nested properties, and/or the like). Further, in some embodiments, each of the properties have a default or original property value that may be modified or changed by software developers as needed or desired to configure the corresponding object or web services component. For example, in some embodiments, custom created and imported objects and web services components may be added to the databases (e.g., libraries) to be retrieved for later use, and may be stored with original or default property values that define the custom created and imported objects and web services components. Accordingly, in various embodiments, each of the objects and web services components may be defined by one or more properties, and the developer may configure each of the objects and web services components by modifying or configuring the properties via the developer interface 140 (e.g., the object browser 144), instead of having to write manual code for each implemented method (e.g., HTTP method).

In some embodiments, the libraries or databases may include various different types of pre-defined web services components corresponding to various implementations of common web services scenarios. For example, the pre-defined web services components may include a file access web services component for accessing (e.g., reading and writing) files in a file system (e.g., folder) or other web services entity or resource, a database access web services component for accessing data in a database or other web services entity or resource (e.g., data set, table, or the like), and/or the like. In some embodiments, the developer may extend any of the pre-defined web services components to generate customized or modified web services components, such that different (or additional) web services can be implemented within the same architecture and framework described herein. In some embodiments, the customized or modified web services components may be added to the libraries or databases, such that the libraries or databases include various pre-defined and extended web services components that may be retrieved for later use.

Still referring to FIG. 2, in some embodiments, the web services manager 150 enables developers to implement various web services for the computer application via a component-based development model, such that various web services may be implemented without having to write manual code or with reduced or minimal manual code. For example, as described above, developers may implement various web services by arranging and configuring one or more web services components in a design area (or design surface) such as a data module. In some embodiments, each of the web services components provides a conduit between an incoming request (e.g., an HTTP request) for a particular web service and a corresponding method (e.g., an HTTP method) for access to a web services entity or resource (e.g., a file system, database, or the like) to provide a response to the request (e.g., the requested data). For example, in some embodiments, each of the web services components may include predefined code to support each of the HTTP methods to access a particular web services entity or resource (e.g., a database, file system, or the like), which is enabled/disabled based on various properties of the web services components, such that the web services components can support various incoming requests for the desired web services according to the configuration of their properties. In some embodiments, the configured property values may be associated (e.g., attached, linked, embedded, or the like) with their corresponding web services components at run time according to an internal data structure, such that the corresponding code, linkages, metadata, descriptions, associated files, and/or the like to implement the corresponding web services can be applied at runtime.

For example, in some embodiments, each of the web services components may include embedded code to support various HTTP methods for a corresponding web service. In some embodiments, the developer enables one or more of the various HTTP methods for the web services component by configuring one or more allowed actions properties (or allowed actions sub-properties) for the web services component at design time. In some embodiments, each of the allowed actions properties (or sub-properties) enable an allowed action (e.g., HTTP verb) in an incoming request for a web service, which in turn enables a corresponding HTTP method in the web services component at runtime. For example, in some embodiments, the allowed actions properties may enable the developer to select (or configure) one or more HTTP verbs (e.g., LIST, GET, PUT, POST, DELETE, etc.) corresponding to one or more HTTP methods for the web services component to handle, which may enable/disable the corresponding code within the web services component depending on the configuration (or selection) of the allowed actions properties (or sub-properties).

In some embodiments, the configured web services component may then perform various methods (e.g., Create, Read, Write, Update, Delete, and/or the like) on the web services entity or resource at runtime according to the enabled HTTP methods based on the configuration of the allowed actions properties (e.g., HTTP verbs) for the corresponding web services component. For example, in some embodiments, the corresponding web service component may parse an HTTP verb from an incoming request to determine whether the HTTP verb (e.g., LIST, GET, PUT, POST, DELETE, etc.) is allowed based on its allowed actions properties, and may process an allowable incoming requests according to a corresponding HTTP method enabled by the allowed actions properties of the corresponding web service component. In some embodiments, the same web service component may be configured to handle multiple HTTP methods according to the configuration of its allowed actions properties (or sub-properties), instead of the developer having to write manual code for each HTTP method implemented.

For example, as shown in FIG. 2, in some embodiments, the web services manager 150 includes a request handler 152, a components manager 154, and a destination mapper 156. In other embodiments, the web services manager 150 may include additional or fewer components and modules to perform the various functions and features described herein. In some embodiments, the request handler 152 configures the web services component to process one or more incoming requests based on the allowed actions properties enabled by the developer. For example, in some embodiments, the developer may select one or more allowed actions properties (or sub-properties) of a corresponding web services component via the developer interface 140 (e.g., the object browser 144) at design time, and the request handler 152 may configure the corresponding web services component at runtime based on the selected allowed actions properties (or sub-properties). Accordingly, the request handler 152 configures the corresponding web services component at runtime to allow or deny incoming requests based on the HTTP verb in the incoming request and the configured allowed actions properties of the corresponding web services component.

In some embodiments, the components manager 152 maintains associations or linkages between the web services components and other objects or resources (e.g., file system, database, or the like) to provide the implemented web services. For example, in some embodiments, a web services component may include a property that defines a link or path to a resource (e.g., a location to a folder) to provide access to the resource. In another example, in some embodiments, a web services component may include a property that defines an object (e.g., a connected database query) to provide access to a resource (e.g., a database, data set, table, or the like). In various embodiments, the components manager 152 may track any linkages to other objects or resources from the properties of the web services component, such that the component manager 156 can configure the web services component to communicate with the linked object or resource to provide the implemented web services at runtime based on the configured properties of the web services components.

In some embodiments, the destination mapper 156 provides a mapping between one or more web services components arranged on the data module and an endpoint (e.g., server, URL, or the like) for processing incoming requests for the implemented web services. For example, in some embodiments, the developer may configure the data module to specify a particular endpoint for the data module, such that any web services components and other objects arranged on the data module is configured to handle incoming requests at the particular endpoint. In some embodiments, the destination mapper 156 may determine the particular endpoint from the data module, and may configure the data module to register the endpoint for the web services components arranged on the data module at runtime. For example, in some embodiments, the destination mapper 156 may append a name or other identifier of a corresponding web services component to the endpoint (e.g., as part of the URL), such that the incoming requests at the endpoint can be distinguished by the different web services components arranged on the data module. Accordingly, in some embodiments, the data module can support multiple web services components to provide various web services from the same endpoint, and the web services components can distinguish incoming requests to handle at the same endpoint based on the name or unique identifier of the web services component included in the request.

Figure 3A:
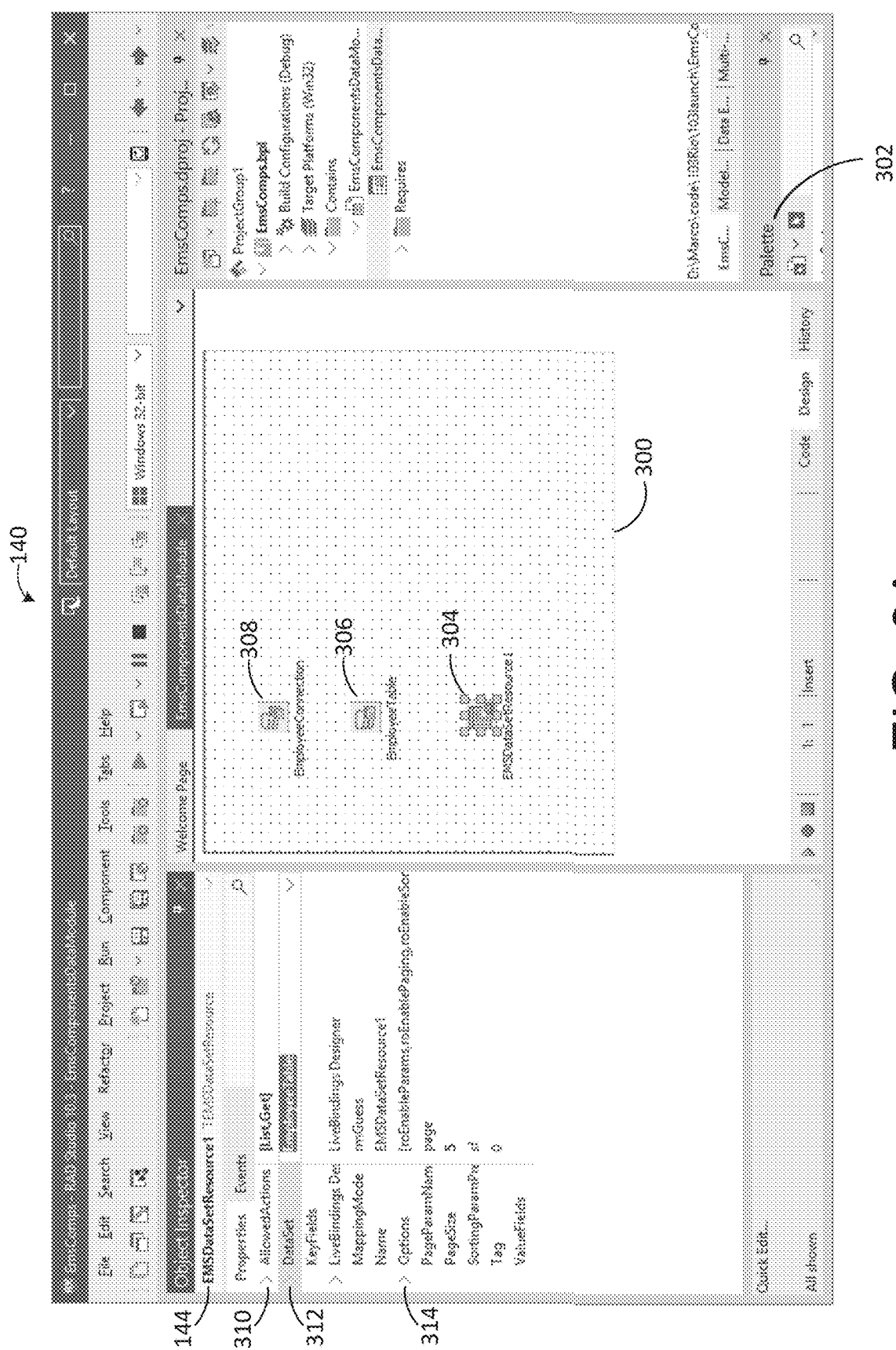
FIGS. 3A to 3D show portions of a developer interface for implementing web services, according to some embodiments.
Figure 3B:
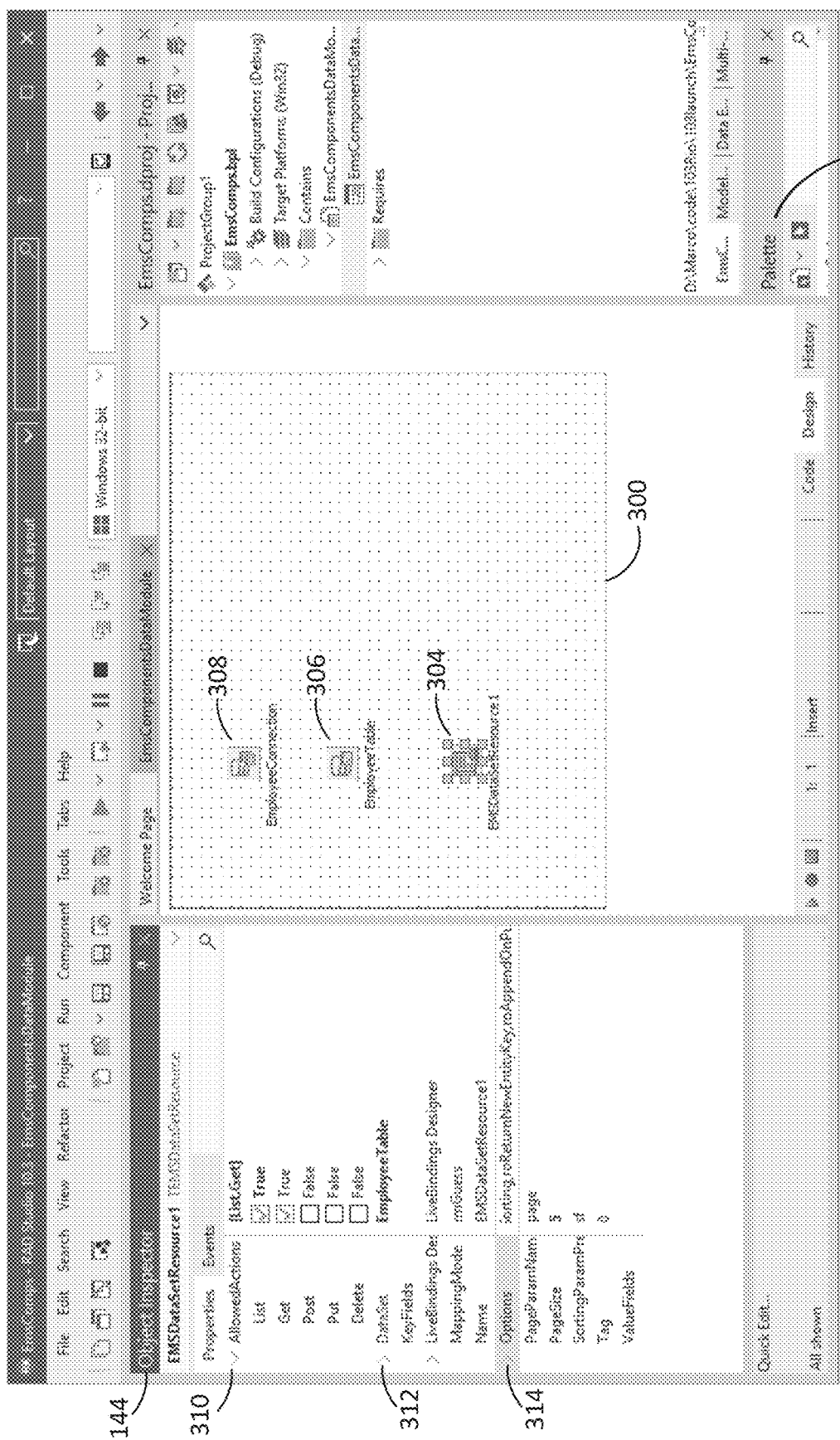
Figure 3C:
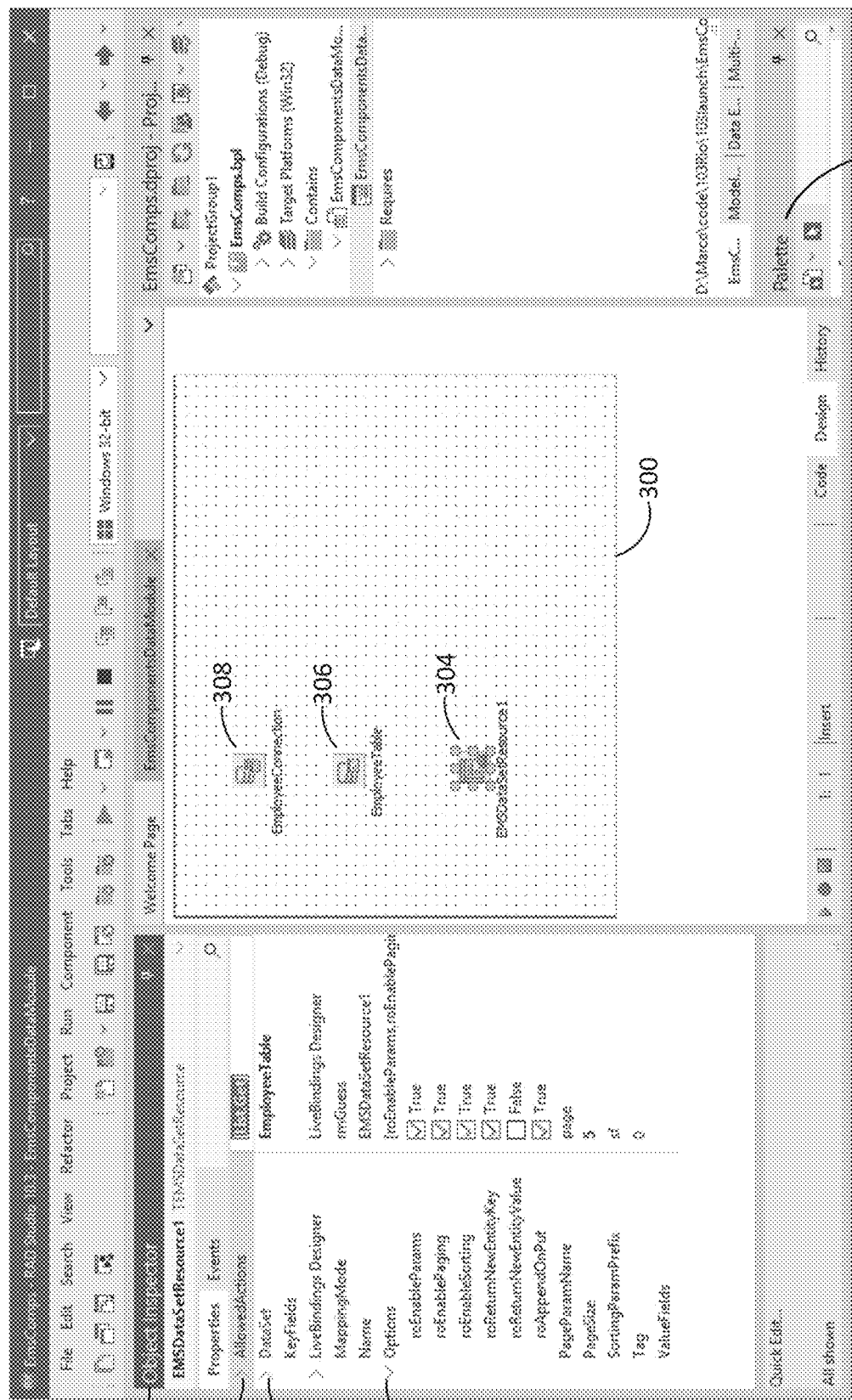
Figure 3D:
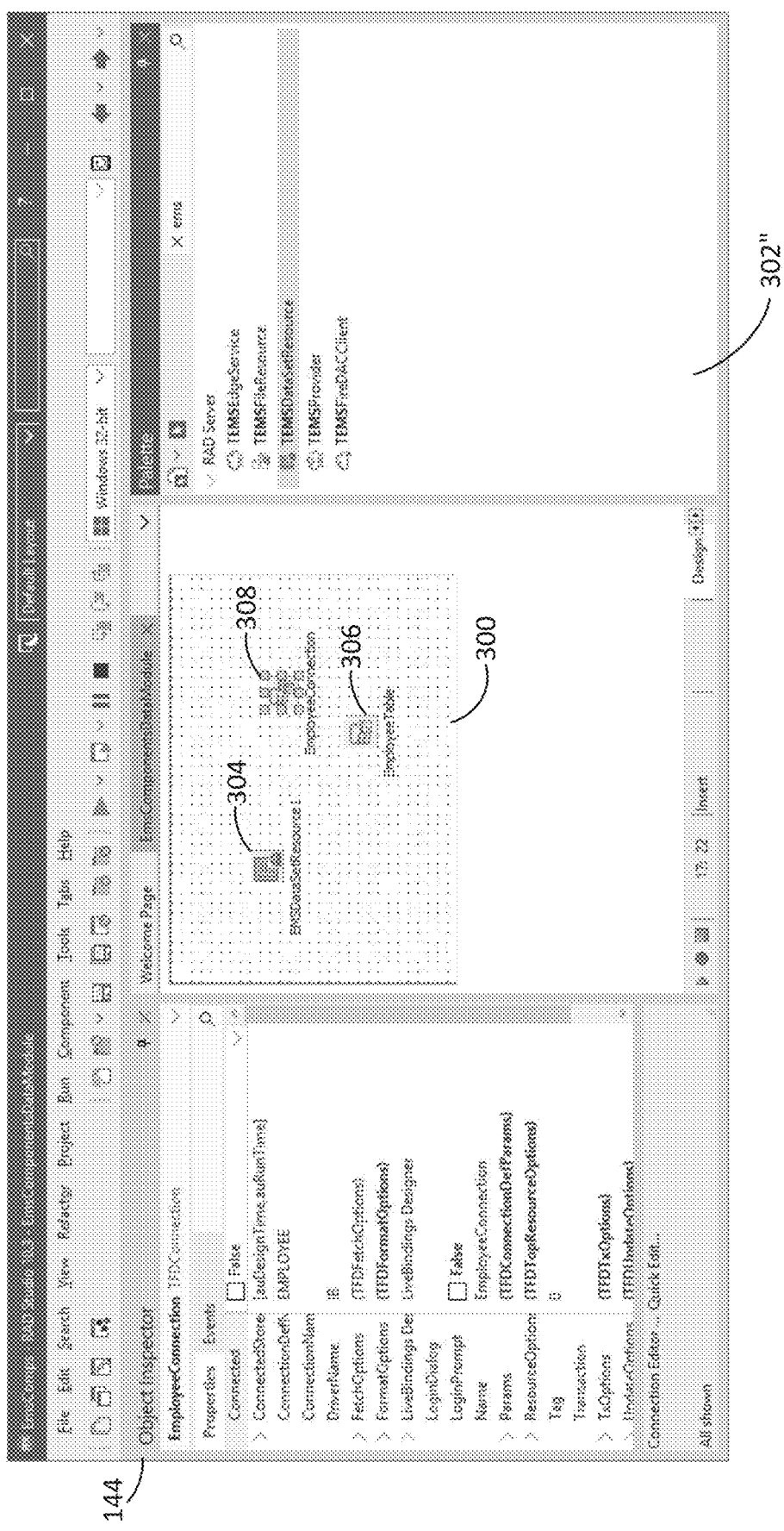

Referring now to FIGS. 3A through 3D, a developer interface 140 is shown according to an example embodiment. As shown in FIGS. 3A through 3C, the developer interface 140 may include an object browser 144 (or object viewer) and a components library (an example of which is shown as a palette 302 or other design surface). In some embodiments, the palette 302 enables the developer to select and arrange various predefined, customized, or imported components and objects (e.g., 304, 306, and 308) into a design area or design surface (e.g., a data module 300) to implement web services for the computer application. For example, in some embodiments, the palette 302 may display a variety of selectable web services components and objects, and/or may display menu options or drop down menus including categories and/or subcategories of various web services components and objects. In some embodiments, as shown in FIG. 3D, a palette 302″ (an expanded view of the palette 302) enables the developer to drag and drop desired web services components (e.g., 304) in the data module 300 (or other suitable design surface). In some embodiments, the developer may select one or more web services components 304 and/or one or more objects 306 and 308 from the palette 302 or 302″, and may arrange the selected web services components and objects into the design area (e.g., the data module 300) to configure one or more web services for the computer application. In other embodiments, the developer may double click a desired web services component from the palette 302 or 302″, and the desired web services component may be automatically added at a default position within the data module 300 (or other suitable design surface). In still other embodiments, the developer may select one or more web services templates from menu options or drop down menus such that a suitable design area or design surface (e.g., the data module 300) with one or more web services components and objects (e.g., 304, 306, and 308) pre-arranged thereon is automatically generated and displayed on the developer interface 140 for further configuration by the developer.

In some embodiments, the object browser 144 enables developers to view, modify, add, and/or delete one or more properties for each of the components and objects arranged on the data module 300. For example, in some embodiments, the developer may select (or highlight) a web service component 304 from the data module 300, and the object browser 144 may display one or more properties associated with the selected web service component 304. The developer may then interact (e.g., modify, add, delete, configure, and/or the like) with the properties of the selected web services component 304 via the object browser 144 to configure the desired web services to be handled by the web service component 304 (and other connected objects 306 and 308) arranged on the data module 300. In other embodiments, the developer may view and modify the properties for the components and objects, but may not add or delete the properties. For example, in some embodiments, instead of being able to delete the properties for the components and objects, the developer may remove or otherwise leave a property value empty (e.g., NULL), such that the corresponding property is effectively disabled for the component or object without deleting the corresponding property.

For example, as shown in FIGS. 3A through 3C, a simplified use case for configuring a database access web service via a design area 300 is shown. However, the present disclosure is not limited to the examples shown in FIGS. 3A through 3C, and it should be appreciated that other suitable web services having various complexities may be configured using various suitable web services components (and connected objects) having various properties according to the type of web services being implemented. In the non-limiting examples of FIGS. 3A through 3C, the design area 300 of the developer interface 140 is shown as a data module 300. However, the present disclosure is not limited thereto, and it should be appreciated that the design area 300 may include any suitable design surface on which web services components can be arranged and implemented (e.g., a window, form, card, pane, frame, and/or the like).

In some embodiments, to implement the database access web service, the developer may arrange one or more components (e.g., 304, 306, and 308) on to a data module 300. In some embodiments, the data module 300 may be configured with a particular endpoint (e.g., URL), such that the components arranged on the data module 300 may be configured to process incoming requests at the particular endpoint. In some embodiments, the one or more components may include a database access web services component 304, a database query object 306, and a database connection object 308. Other web services may be implemented with various other components and arrangements having other properties than those shown in FIGS. 3A-3C. In some embodiments, the database access web services component 304 defines the allowed actions 310 for processing incoming requests for the database access web service at the particular endpoint. For example, as shown in FIG. 3B, the allowed actions properties 310 of the database access web services component 305 may include the HTTP verbs for List, Get, Post, Put, and Delete. Thus, in this example, the database access web services component 304 includes predefined embedded code to process HTTP methods for each of the HTTP verbs List, Get, Post, Put, and Delete. However, as shown in FIG. 3B, only the HTTP verbs for List and Get have been selected (e.g., set to True), such that the allowed actions for the HTTP verbs Post, Put, and Delete are disabled. Accordingly, in some embodiments, the request handler 152 may configure the database access web services component 304 by enabling the HTTP methods associated with the enabled List and Get verbs while disabling the HTTP methods associated with the Post, Put, and Delete verbs at runtime.

In some embodiments, the database access web services component 304 includes a link property 312 that defines a connection to another object (e.g., the database query object 306) for communicating with a resource (e.g., a database, data set, table, or the like) to provide a response to the incoming request for the corresponding web service. In other embodiments, a web services component (e.g., a file access web services component) may include a link property that defines a direct connection (e.g., a path or location) to a resource (e.g., a file system, folder, or the like) for providing a response to the incoming request for the corresponding web service. In various embodiments, the link property of the web services component identifies the object or resource providing access to respond to the incoming request for the web services. For example, as shown in FIG. 3A, the database access web services component 304 is connected to the database query object 306 via the link property 312 to access the database to provide the requested data. In this example, the database connection object 308 may define a connection to the database, and the database query object 306 may be connected to the database connection object 308 to query the database. The database query object 306 includes one or more query statements for querying the database according to the verb in the incoming request and the allowed actions configured for the database access web services component 304. Accordingly, in some embodiments, the component manager 154 may configure the database access web services component 304 and/or the other objects 306 and 308 at runtime to maintain the connections or linkages to the resources for providing access to the requested web services.

In some embodiments, the database access web services component 304 may further include an options property 314 to enable various features for responding to the incoming requests, such as, for example, key fields, sorting fields, paging configuration, and/or the like. In other embodiments, other web services components may have other properties for enabling various features depending on the type of web services being implemented. For example, as shown in FIG. 3C, the developer may enable various features using the options property 314 by selecting (e.g., enabling) the desired features via the object browser 144 such that the data returned by the database query object 306 is formatted or otherwise organized according to the enabled options properties 314. Accordingly, in various embodiments, the web services components may define other features for responding to incoming requests, without requiring manual code for implementing each of the features.

In some embodiments, at runtime, the destination mapper 156 may configure the data module 300 to register the endpoint URL in an endpoint registration database of a web services system (e.g., a web services server). In some embodiments, the registration may include a name or other unique identifier of each of the web services components arranged on the data module 300, such that the unique identifier of the web services components can be used to route incoming requests to the web services component. The request handler 152 may configure the web services component based on the configured allowed actions properties of the web services component, and the component manager 154 may configure the web services component and/or other connected objects to communicate with the resource or entity providing the requested service according to the configuration of the properties of the web services component and/or other connected objects.

Accordingly, at start-up, the data module 300 may register with the web services system. The registration may indicate the endpoint (or URL) at which the data module 300 and its components (e.g., the web services component 304 and other objects 306 and 308) are capable of handling incoming requests. In some embodiments, the registration process may be performed only once at startup, or may be performed periodically as needed or desired. Thus, in some embodiments, for an incoming HTTP request, the web services system (e.g., the web services server) receives the incoming HTTP request and looks for a match in its endpoint registration database. The web services system identifies the database access web services component 304 (e.g., based on the unique identifier) as a match from the endpoint registration database, and passes the incoming request to the database access web services component 304.

The database access web services component 304 parses the incoming request to identify the HTTP verb in the incoming request, and determines whether the HTTP verb is allowed based on its configured allowed actions properties. If the HTTP verb is not allowed, the database access web services component 304 denies the request, and a suitable message is returned to the requestor (e.g., the requesting client) indicating that the request was denied. If the HTTP verb is allowed, the database access web services component 304 parses additional parameters (e.g., HTTP parameters) in the incoming request, and passes the request parameters to the database query object 306 to access the database. The database access web services component 304 can perform different operations (e.g., create, read, update, delete, etc.) on the database query object 306 according to the HTTP verb in the incoming request, and the database query object 306 may include different queries corresponding to each of the different operations, or may automatically generate a secondary query from a select statement based on the request parameters. The database query object 306 determines from the request parameters a suitable query for responding to the incoming request, and connects to the database via the database connection object 308 to pass the suitable query to the database and retrieve the requested data. The requested data is sent to the database access web services component 304, which is then passed to the web services system to provide the requested data to the requesting client. In some embodiments, the database access web services component 304 may convert the requested data into a suitable format (e.g., JSON, XML, or the like), and may provide the converted data to the web services system for providing the converted data to the requesting client.

Figure 4:
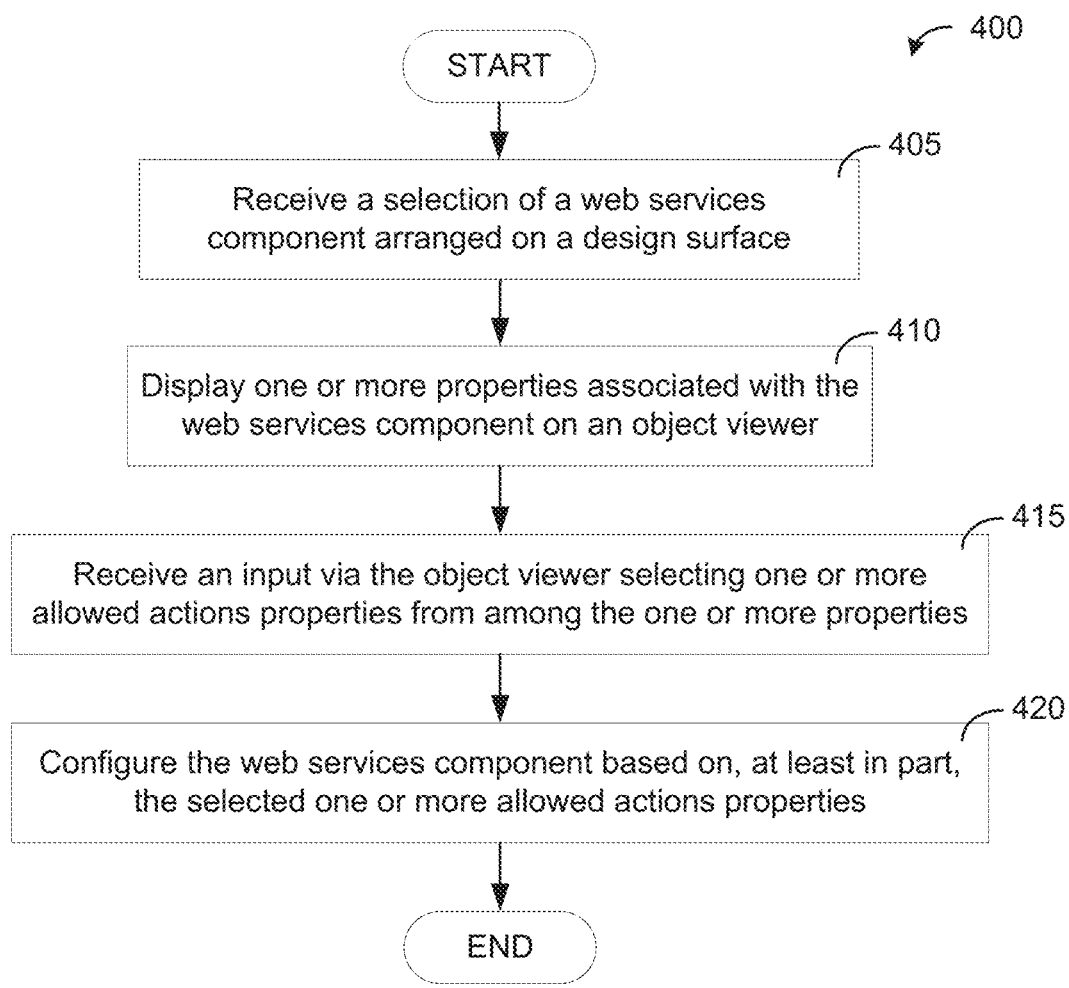
FIG. 4 is a flow diagram of a method for configuring a web services component to implement a corresponding web service, according to some embodiments.

FIG. 4 is a flow diagram of a method 400 for configuring a web services component to implement a corresponding web service, according to some embodiments. The functionalities of the method or process 400 may be implemented using, or performed by, the components detailed herein in connection with FIGS. 1-3. In brief overview, the method 400 of FIG. 4 may be used to configure a web services component at design time to handle various HTTP methods for a corresponding web service at runtime. For example, the method 400 of FIG. 4 may be used to configure the database access web services component 304 shown in FIGS. 3A-3C.

In more detail, the method 400 starts and at operation 405, a selection of a web services component arranged on a design surface is received. For example, in some embodiments, a developer may select a suitable web services component from the palette 302, and may arrange the suitable web services component on the data module 300 to implement a corresponding web service. In various embodiments, the web services component may include predefined code to handle various HTTP methods for the corresponding web service, and may be configured by the developer by configuring various properties associated with the web services component. Accordingly, at operation 410, one or more properties associated with the web services component is displayed on an object viewer (e.g., the object browser 144) of the developer interface 140.

At operation 415, an input selecting one or more allowed actions properties via the object viewer is received. For example, in some embodiments, the various properties associated with the web services component may include one or more allowed actions property (or sub-properties). Each of the allowed actions properties (or sub-properties) may configure the web services component to handle a corresponding HTTP method in an incoming request. The developer may select desired ones of the allowed actions properties (or sub-properties) from the object viewer to enable or disable corresponding ones of the HTTP methods that the web services component can handle at runtime. Accordingly, at operation 420, the web services component is configured based on, at least in part, the selected one or more allowed actions properties at operation 415. For example, at runtime, the request handler 152 may configure the web services component based on the allowed actions properties to process incoming requests via one or more enabled HTTP methods corresponding to the enabled allowed actions properties. Accordingly, in some embodiments, the web services component may be configured to handle multiple HTTP methods for a corresponding web service according to the enabled/disabled allowed actions properties (or sub-properties) of the web services component.

Figure 5:
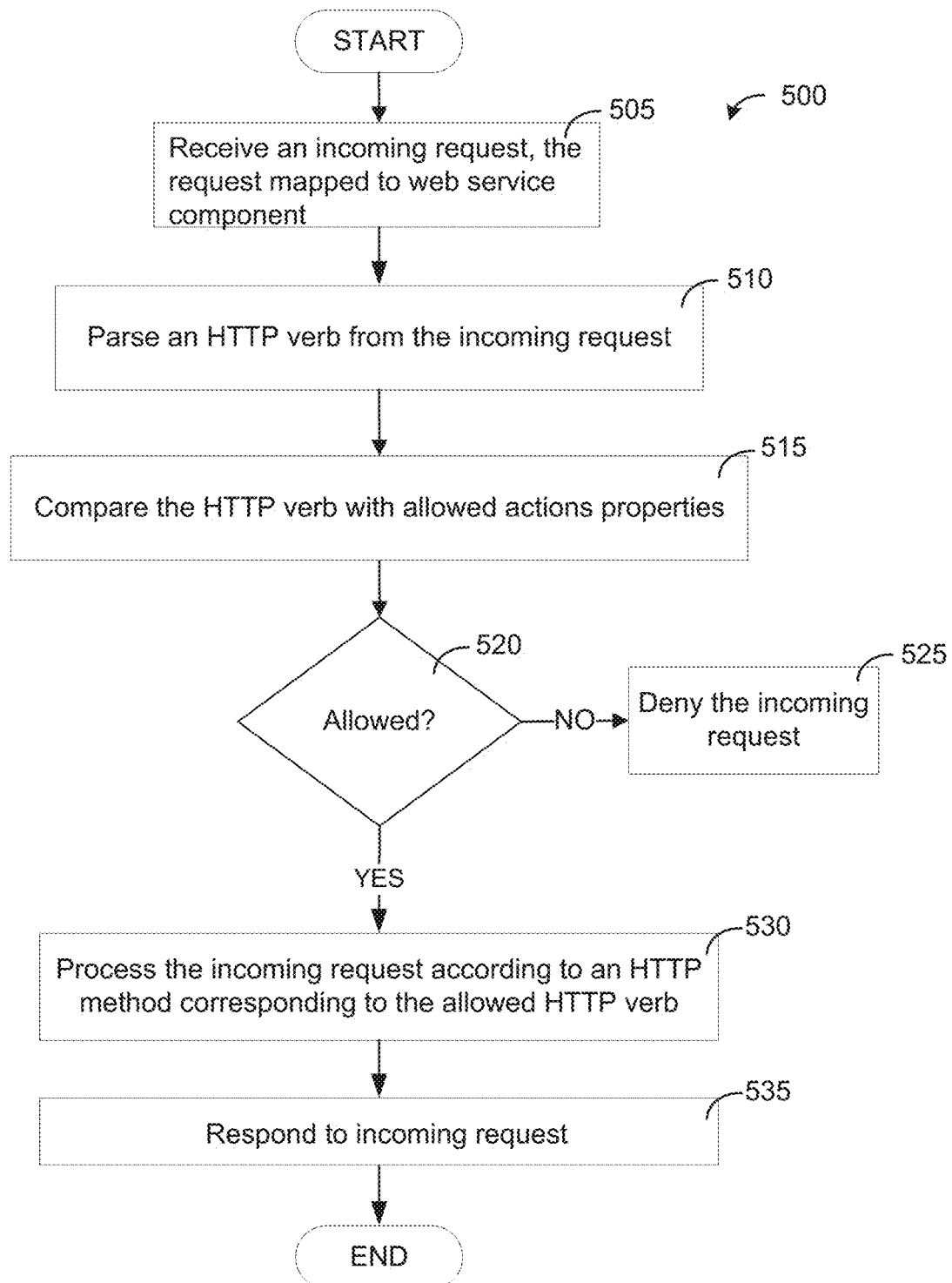
FIG. 5 is a flow diagram of a method for processing incoming requests for web services by a web services component, according to some embodiments.

FIG. 5 is a flow diagram of a method 500 for processing incoming requests for web services by a web services component, according to some embodiments. The functionalities of the method or process 500 may be implemented using, or performed by, the components detailed herein in connection with FIGS. 1-3. In brief overview, the method 500 of FIG. 5 may be used to process an incoming request for a web service implemented by a corresponding web services component. For example, the method 500 of FIG. 5 may be used to by a web services component configured at design time via the method 400 of FIG. 4, to process incoming requests for the corresponding web service at runtime according to its configured allowed actions properties.

In more detail, the method 500 starts and at operation 505, the web services component receives an incoming request for a corresponding web service, the incoming request at a particular endpoint being mapped to the web services component. For example, in some embodiments, the web services component may receive the incoming request from a web services server hosting or otherwise providing the web services. In some embodiments, the web services server may identify the web services component from an endpoint registration database. For example, in some embodiments, the endpoint registration database may include an entry corresponding to the endpoint URL and may identify the web services component (e.g., via a name or unique identifier) as a corresponding component to process the incoming requests for the endpoint URL. Accordingly, in some embodiments, the web services server may forward the incoming request to the identified web services component to process the incoming request, such that the web services component receives the incoming request at operation 505.

At operation 510, in some embodiments, the web services component parses an HTTP verb from the incoming request. For example, in some embodiments, the incoming request may be an HTTP request including an HTTP verb corresponding to a particular HTTP method of the requested web service. In some embodiments, the web services component may determine from the parsed HTTP verb whether a corresponding HTTP method has been enabled or disabled. For example, in some embodiments, the web services component may determine from its allowed actions properties whether the corresponding HTTP method for the parsed HTTP verb has been enabled.

Accordingly, at operation 515, in some embodiments, the web services component compares the parsed HTTP verb with its allowed actions properties to determine whether the incoming request is allowed or denied. In response to the web services component determining that the parsed HTTP verb is not allowed at operation 520 (e.g., NO), then the incoming request is denied at operation 525. On the other hand, in response to the web services component determining that the parsed HTTP verb is allowed at operation 520 (e.g., YES), then the incoming request is processed according to an enabled HTTP method corresponding to the allowed HTTP verb at operation 530. For example, in some embodiments, the parsed HTTP verb may not be allowed in response to determining that a corresponding allowed actions property for the HTTP verb has been disabled (e.g., not selected), whereas the parsed HTTP verb is allowed in response to determining that the corresponding allowed actions property for the HTTP verb has been enabled (e.g., selected). At operation 535, the web services component responds to the incoming request. For example, a link property of the web services component identifies the object or resource providing access to respond to the incoming request for the web services. Accordingly, in various embodiments, various web services may be quickly and easily implemented via corresponding web services components by configuring the properties of the web services components, instead of writing manual code to implement each HTTP method for each endpoint (e.g., URL) of the web services.

What is claimed is:

1. A web services development platform comprising:
one or more processors; and
memory coupled to the one or more processors and storing instructions that, when executed by the one or more processors, cause the one or more processors to:
receive a web service component arranged on a design surface of the web services development platform to implement a web service for a computer application, the web service component including predefined code to support a plurality of methods for the web service;
display a plurality of predefined properties associated with the web service component on an object viewer of the web services development platform;
receive an input via the object viewer configuring the web service component by enabling one or more predefined allowed actions properties from among the plurality of properties, each of the predefined allowed actions properties corresponding to a method from among the plurality of methods for the web service; and
configure, at a design time, the web service component based on, at least in part, the selected one or more predefined allowed actions properties to enable the first web service component to process incoming requests at runtime according to the enabled ones of the predefined allowed actions properties for the first web service component.

2. The web services development platform of claim 1, wherein the design surface is a data module.

3. The web services development platform of claim 1, wherein each of the methods correspond to a Hypertext Transfer Protocol (HTTP) operation for the web service, and each of the predefined allowed actions properties corresponds to an HTTP verb for a corresponding HTTP operation, the HTTP verb being one of LIST, GET, PUT, POST, or DELETE.

4. The web services development platform of claim 3, wherein the input includes a selection of at least two of the predefined allowed actions properties such that the first web service component is configured to support at least two corresponding HTTP operations for the web service.

5. The web services development platform of claim 3, wherein the first web service component comprises predefined code to support a plurality of HTTP operations, and the predefined allowed actions properties are selected to enable corresponding ones of the HTTP operations.

6. The web services development platform of claim 1, wherein another property of the plurality of properties corresponds to a link property indicating a connection to a resource for serving responses to the incoming requests, the resource being one of a database, a data set, a table, a file system, or a folder.

7. The web services development platform of claim 6, wherein the link property indicates a direct path to the resource for serving responses to the incoming requests, the direct path being a location.

8. The web services development platform of claim 6, wherein the link property indicates a connection to another object, the other object connecting to the resource for serving responses to the incoming requests.

9. The web services development platform of claim 8, wherein the other object is a database query object comprising a connection to the resource and one or more queries for retrieving data from the resource.

10. The web services development platform of claim 1, wherein another property of the plurality of properties correspond to an options property to enable sorting or paging of requested data associated with an incoming request.

11. A method for implementing web services utilizing a component-based development model, the method comprising:
  receiving a web service component arranged on a design surface of the web services development platform to implement a web service for a computer application, the web service component including predefined code to support a plurality of methods for the web service;
  displaying a plurality of predefined properties associated with the web service component on an object viewer of the web services development platform;
  receiving an input via the object viewer configuring the web service component by enabling one or more predefined allowed actions properties from among the plurality of properties, each of the predefined allowed actions properties corresponding to a method from among the plurality of methods for the web service; and
  configuring, at a design time, the web service component based on, at least in part, the selected one or more predefined allowed actions properties to enable the first web service component to process incoming requests at runtime according to the enabled ones of the predefined allowed actions properties for the first web service component.

12. The method of claim 11, wherein the design surface is a data module.

13. The method of claim 11, wherein each of the methods correspond to a Hypertext Transfer Protocol (HTTP) operation for the web service, and each of the predefined allowed actions properties corresponds to an HTTP verb for a corresponding HTTP operation, the HTTP verb being one of LIST, GET, PUT, POST, or DELETE.

14. The method of claim 13, wherein the input includes a selection of at least two of the predefined allowed actions properties such that the first web service component is configured to support at least two corresponding HTTP operations for the web service.

15. The method of claim 13, wherein the first web service component comprises predefined code to support a plurality of HTTP operations, and the predefined allowed actions properties are selected to enable corresponding ones of the HTTP operations.

16. The method of claim 11, wherein another property of the plurality of properties corresponds to a link property indicating a connection to a resource for serving responses to the incoming requests, the resource being one of a database, a data set, a table, a file system, or a folder.

17. The method of claim 16, wherein the link property indicates a direct path to the resource for serving responses to the incoming requests.

18. The method of claim 16, wherein the link property indicates a connection to another object, the other object connecting to the resource for serving responses to the incoming requests.

19. The method of claim 8, wherein the other object is a database query object comprising a connection to the resource and one or more queries for retrieving data from the resource.

20. The method of claim 11, wherein another property of the plurality of properties correspond to an options property to enable sorting or paging of requested data associated with an incoming request.

\* \* \* \* \*